(12) United States Patent
Kwon et al.

(10) Patent No.: US 9,343,712 B2
(45) Date of Patent: May 17, 2016

(54) SECONDARY BATTERY

(71) Applicant: Samsung SDI Co., Ltd., Yongin-si, Gyeonggi-do (KR)

(72) Inventors: Young-Woong Kwon, Yongin-si (KR); Byong-Gon Lee, Yongin-si (KR); Maeng-Eun Lee, Yongin-si (KR); Jake Kim, Yongin-si (KR); Jee-Hoon Han, Yongin-si (KR); Seon-Hong Lee, Yongin-si (KR); Jong-Man Kim, Yongin-si (KR); Hee-Sung Choi, Yongin-si (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 168 days.

(21) Appl. No.: 14/104,863

(22) Filed: Dec. 12, 2013

(65) Prior Publication Data

US 2014/0308573 A1    Oct. 16, 2014

Related U.S. Application Data

(60) Provisional application No. 61/810,660, filed on Apr. 10, 2013.

(51) Int. Cl.
| | |
|---|---|
| *H01M 2/02* | (2006.01) |
| *H01M 6/08* | (2006.01) |
| *H01M 2/16* | (2006.01) |
| *H01M 10/052* | (2010.01) |
| *H01M 10/0587* | (2010.01) |

(52) U.S. Cl.
CPC ............ *H01M 2/022* (2013.01); *H01M 2/026* (2013.01); *H01M 2/0277* (2013.01); *H01M 2/0287* (2013.01); *H01M 10/052* (2013.01); *H01M 10/0587* (2013.01)

(58) Field of Classification Search
USPC .................................................. 429/164, 166
IPC .................. H01M 2/0257,2/0287, 2/02, 2/0267
See application file for complete search history.

(56) References Cited

U.S. PATENT DOCUMENTS

| | | | |
|---|---|---|---|
| 6,013,379 A * | 1/2000 | Uesugi et al. | 428/623 |
| 8,097,357 B2 * | 1/2012 | Mori et al. | 429/164 |
| 2008/0026288 A1 | 1/2008 | Marple et al. | |

FOREIGN PATENT DOCUMENTS

| | | |
|---|---|---|
| JP | 2009-238387 A | 10/2009 |
| KR | 10-2001-0039434 A | 5/2001 |

* cited by examiner

*Primary Examiner* — Patrick Ryan
*Assistant Examiner* — Julian Anthony
(74) *Attorney, Agent, or Firm* — Knobbe, Martens, Olson & Bear, LLP

(57) ABSTRACT

A secondary battery is disclosed. In one aspect, the battery includes an electrode assembly including i) a positive electrode plate on which a positive active material is formed, ii) a negative electrode plate on which a negative active material is formed, and iii) a separator separating the positive and negative electrode plates. The battery also includes a can accommodating the electrode assembly, wherein the can has an inner surface facing the electrode assembly, an inner active material layer formed on the inner surface of the can and a securing layer covering the inner active material layer.

20 Claims, 4 Drawing Sheets

SECONDARY BATTERY

RELATED APPLICATION

This application claims priority to and the benefit of Provisional Patent Application No. 61/810,660 filed on Apr. 10, 2013 in the U.S Patent and Trademark Office, the entire contents of which are incorporated herein by reference.

BACKGROUND

1. Field

The described technology generally relates to secondary batteries.

2. The Description of the Related Technology

In general, a secondary (rechargeable) battery includes i) an electrode assembly in a cylindrical shape, ii) a can coupled to the electrode assembly, iii) an electrolyte injected into the inside of the can to allow lithium ions to move, and iv) a cap assembly coupled to one side of the can, preventing a leakage of the electrolyte, and preventing a removal of the electrode assembly. Such a secondary battery usually has a capacity from about 2000 mA to about 4000 mA, and thus the secondary battery is mainly mounted in portable devices such as a notebook computer, a digital camera, and a camcorder that generally require a large capacity of power. As an example, multiple secondary batteries are connected to one another in series or in parallel, assembled as a hard pack having a predetermined shape in which a protection circuit is mounted, coupled to an electronic device, and used as a power supply.

A method of manufacturing the secondary battery stacks a negative plate coated with a negative active material, a separator, and a positive plate coated with a positive active material, couples one end of the stack structure to a winding axis having a pole shape, approximately rolls the stack structure in a cylindrical shape, and forms the electrode assembly. Thereafter, the electrode assembly is inserted into the cylindrical can. Then, the electrolyte is injected into the cylindrical can, and the cap assembly is coupled to a top portion of the cylindrical can, and thus a lithium ion battery having a cylindrical shape is completed.

SUMMARY

One inventive aspect is a secondary assembly having improved charging and discharging capacity.

Another aspect is a secondary battery which includes an electrode assembly formed by stacking and winding a positive electrode plate in which a positive active material is disposed, a negative electrode plate in which a negative active material is disposed, and a separator, a can accommodating the electrode assembly, an inner active material layer formed by disposing one of the positive active material and the negative active material in an inner surface of the can, and a ceramic layer formed to cover the inner active material layer.

The can may have a cylindrical or angular shape. A cross-section of the inner active material layer may have a wave shape. A groove may be formed in the inner active material layer. The ceramic layer may include at least one of a metal oxide, a metal nitride, a metal hydroxide, and a metal phosphide.

The metal oxide may be an oxide of metal including at least one of Al, Ti, Cr, Zr, Ca, Si, and Mg. The metal nitride may be a nitride of metal including at least one of Al, Ti, Cr, Zr, Ca, Si, and Mg. The metal hydroxide may be a hydroxide of metal including at least one of Al, Ti, Cr, Zr, Ca, Si, and Mg. The metal phosphide may be a phosphide of metal including at least one of Al, Ti, Cr, Zr, Ca, Si, and Mg.

Another aspect is a secondary battery, comprising: an electrode assembly comprising i) a positive electrode plate on which a positive active material is formed, ii) a negative electrode plate on which a negative active material is formed, and iii) a separator separating the positive and negative electrode plates; a can accommodating the electrode assembly, wherein the can has an inner surface facing the electrode assembly; an inner active material layer formed on the inner surface of the can; and a securing layer covering the inner active material layer.

In the above battery, the securing layer is formed of a material comprising ceramic. In the above battery, the inner active material layer is formed of a material substantially similar to one of the positive and negative active materials. In the above battery, the inner active material layer has a substantially uniform thickness. In the above battery, the thickness of the securing layer is in the range from about 2 μm to about 6 μm. In the above battery, the surface of the inner active material layer is non-planar. In the above battery, the surface of the inner active material layer has a wave shape.

In the above battery, the inner active material layer is discontinuous. In the above battery, the securing layer is formed of a material comprising at least one of a metal oxide, a metal nitride, a metal hydroxide, and a metal phosphide. In the above battery, each of the metal oxide, the metal nitride, the metal hydroxide and the metal phosphide comprises at least one of Al, Ti, Cr, Zr, Ca, Si, and Mg. In the above battery, the separator is formed on the outermost surface of the electrode assembly.

In the above battery, the securing layer is formed of a material comprising heat resistant resin. In the above battery, the heat resistant resin comprises at least one of the following: aramid resin, polyamideimide resin and polyimide resin. In the above battery, the ratio of the heat resistant resin and the remaining component of the securing layer is in the range from about 50 wt %:about 50 wt. % to about 90 wt. %:about 10 wt. %. In the above battery, the ratio of the heat resistant resin and the remaining component of the layer is in the range from about 60 wt %:about 40 wt. % to about 80 wt. %:about 20 wt. %.

Another aspect is a secondary battery, comprising: an electrode assembly having a first portion which is coated with a positive active material and a second portion which is coated with a negative active material, and wherein the first portion is separated from the second portion; a can accommodating the electrode assembly, wherein the can has an inner surface facing the electrode assembly, and wherein the inner surface is coated with one of the positive and negative active materials; and a securing layer at least partially covering the coated inner surface of the can.

In the above battery, the securing layer has a surface contacting the inner surface of the can, and wherein a plurality of concave portions and a plurality of convex portions are alternately formed on the surface of the securing layer.

Another aspect is a secondary battery, comprising: a can accommodating an electrode assembly, wherein the can has an inner surface facing the electrode assembly, and wherein the can has an electrical polarity; an inner active material layer formed on the inner surface of the can, wherein the inner active material layer is formed of an active material having the same electrical polarity as the can; and a ceramic layer at least partially covering the inner active material layer.

In the above battery, the ceramic layer has a surface contacting the inner surface of the can, and wherein a plurality of concave portions and a plurality of convex portions are alternately formed on the surface of the ceramic layer. In the above battery, the inner active material layer is discontinuous.

DETAILED DESCRIPTION

Figure 1:
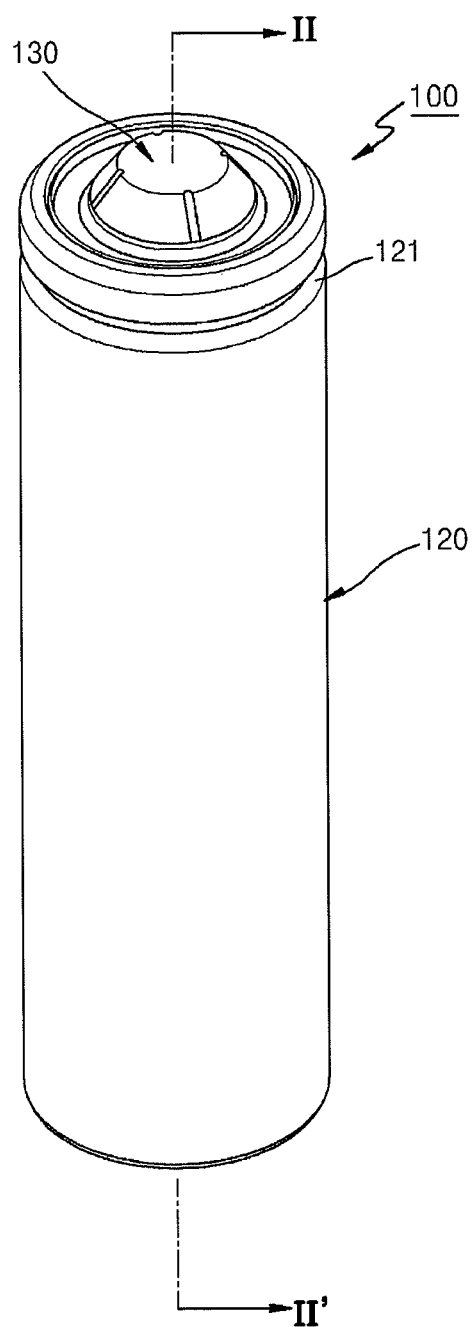
FIG. 1 is a schematic perspective view of a secondary battery, according to an embodiment.

Embodiments will be described with reference to the accompanying drawings, wherein like reference numerals refer to the like elements throughout. In the drawings, the thicknesses of layers and regions may be exaggerated for clarity.

Figure 2:
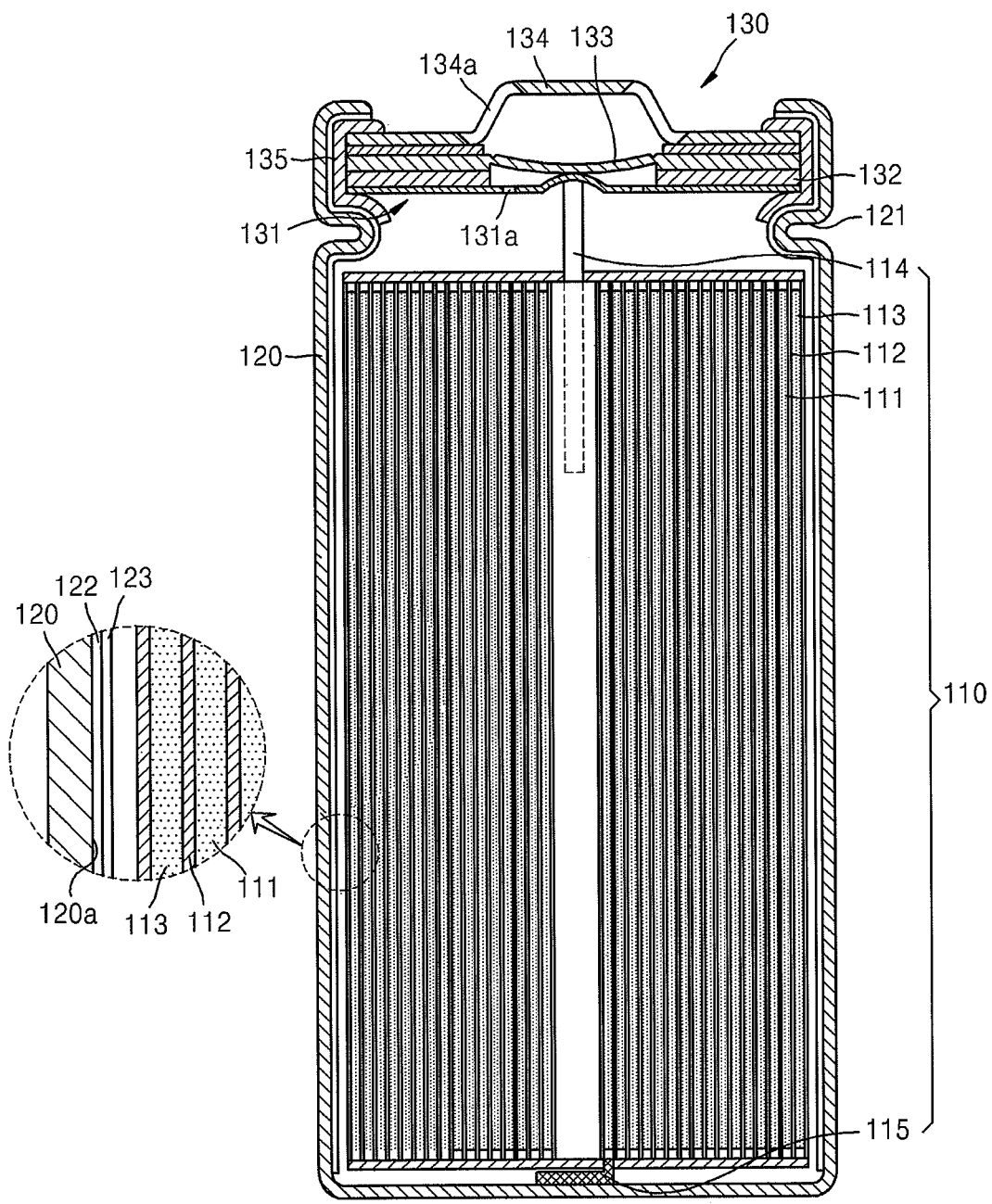
FIG. 2 is a schematic cross-sectional view taken from a line II-II' of FIG. 1.
Figure 3A:
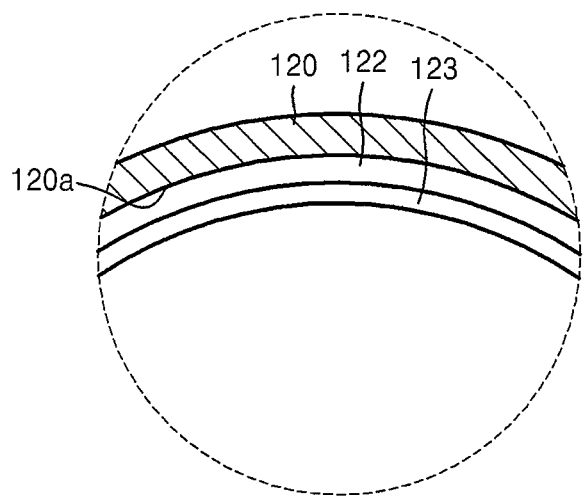
FIG. 3A is a partial cross-sectional view of an inner active material layer and a ceramic layer that are formed in an inner surface of a can, according to an embodiment.
Figure 3B:
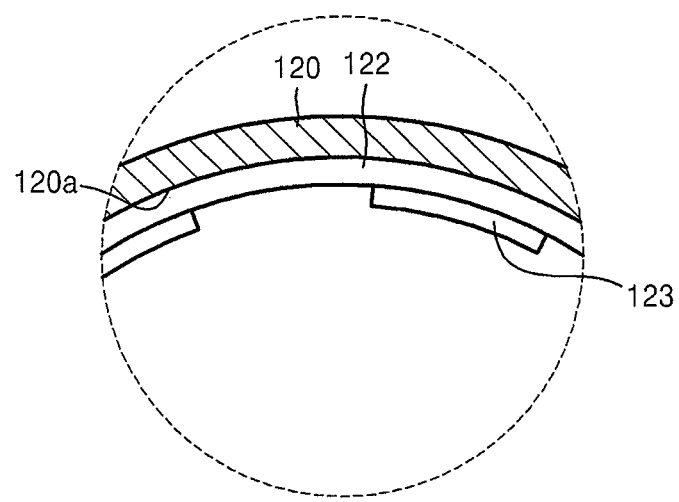
FIG. 3B is a partial cross-sectional view of an inner active material layer and a ceramic layer that are formed in an inner surface of a can, according to another embodiment.

FIG. 1 is a schematic perspective view of a secondary battery 100, according to an embodiment. FIG. 2 is a schematic cross-sectional view taken from a line II-II' of FIG. 1. FIG. 3A is a partial cross-sectional view of an inner active material layer and a ceramic layer that are formed in an inner surface of a can, according to an embodiment. FIG. 3B is a partial cross-sectional view of an inner active material layer and a ceramic layer that are formed in an inner surface of a can, according to another embodiment.

As shown in FIGS. 1 through 3, the secondary battery 100 may include an electrode assembly 110, a can 120, and a cap assembly 130.

In some embodiments, the electrode assembly 100 is formed by sequentially stacking and winding a negative electrode plate 111, a separator 112, and a positive electrode plate 113 in a jelly-roll shape. The negative electrode plate 111 may be formed of a copper (Cu) foil and is coated with a negative active material such as graphite.

The separator 112 is disposed between the negative and positive electrode plates 111 and 113, functions to prevent a short and move lithium ions only, and may be formed of a material such as polyethylene (PE), polypropylene (PP), etc. The positive electrode plate 113 may be formed of an aluminum (Al) foil and is coated with a positive active material such as lithium cobalt oxide ($LiCoO_2$). A positive electrode tap 114 protruding upward from the positive electrode plate 113 may be installed in the center of the electrode assembly 110. The positive electrode tap 114 may be formed of aluminum (Al).

A negative electrode tap 115 protruding downward from the negative electrode plate 111 may be installed in the center of the electrode assembly 110. The negative electrode tap 115 may be formed of nickel (Ni), and is electrically connected to one surface of the can 120.

The negative electrode plate 111, the negative active material, the separator 112, the positive electrode plate 113, the positive electrode tap 114, and the negative electrode tap 115 are not limited to the above-described materials and other materials may be used.

The can 120 accommodates the electrode assembly 110 and may have an exterior in a cylindrical shape. The can 120 may be formed of steel, stainless steel, aluminum, or an equivalent thereof, and other materials. Although the exterior of the can 120 according to the present embodiment has the cylindrical shape, the present invention is not limited thereto. That is, the exterior of the can 120 may have an angular shape.

A beading part 121 sunken inward is formed in a side surface of the can 120. The beading part 121 firmly fixes and supports the cap assembly 130 to the can 120 to prevent the cap assembly 130 from being separated and to prevent an electrolyte from leaking to the outside. Meanwhile, an inner active material layer 122 is formed in an inner surface 120a of the can 120.

The inner active material layer 122 may be formed by disposing a negative active material that is the same as or different from that coated on the negative electrode plate 111 in the inner surface 120a of the can 120. In this case, the can 120 is used as a negative electrode basic material and thus a filling amount of the negative active material may be increased by an area of the inner surface 120a of the can 120. Further, in this case, a part of the electrode assembly 110 that is the closest to the inner surface 120a of the can 120 is configured as the positive electrode plate 113 in which the positive active material is disposed so that charging and discharging responses may occur.

Figure 4:
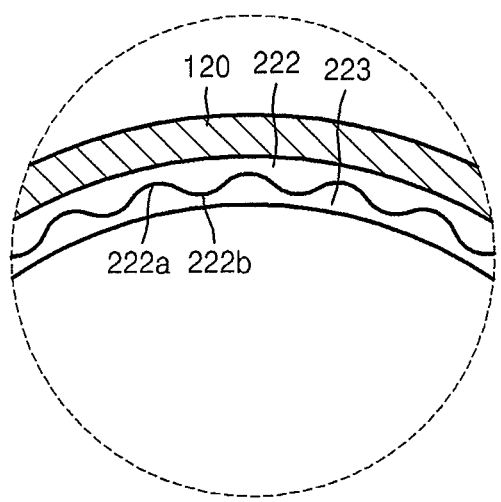
FIG. 4 is a partial cross-sectional view of an inner active material layer and a ceramic layer that are foamed in an inner surface of a can, according to another embodiment.

In some embodiments, the inner active material layer 122 has a substantially uniform thickness along the inner surface 120a of the can 120 as shown in FIG. 3A. Although the inner active material layer 122 according to the present embodiment has the uniform thickness along the inner surface 120a of the can 120, the present invention is not limited thereto. For example, as shown in FIG. 4, an inner active material layer 222 may be formed in a wave shape along the inner surface 120a of the can 120. That is, FIG. 4 is a partial cross-sectional view of the inner active material layer 222 and a ceramic layer 223 formed in the inner surface 120a of the can 120, according to another embodiment. A cross-sectional view of the inner active material layer 222 formed in the inner surface 120a of the can 120 has the wave shape in which a concave portion 222a concaved toward the inner active material layer 222 and a convex portion 222b protruding from the inner active material layer 222 are alternatively repeated. This structure increases a contact area between the ceramic layer 223 disposed to cover the inner active material layer 222 and the inner active material layer 222, thereby further enhancing a function of preventing the inner active material layer 222 from being separated and a function of the ceramic layer 223 relating to a battery stability.

Figure 5:
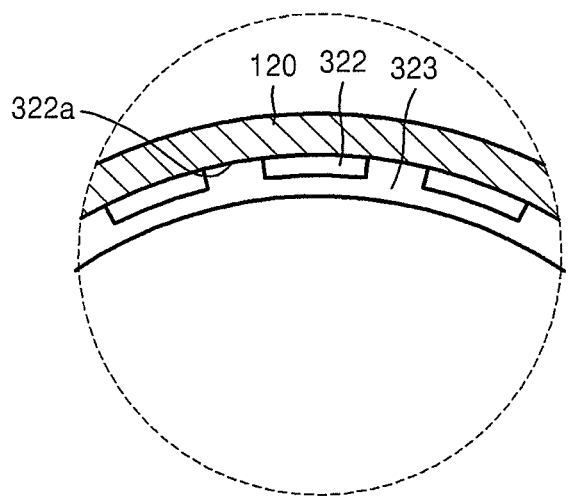
FIG. 5 is a partial cross-sectional view of an inner active material layer and a ceramic layer that are formed in an inner surface of a can, according to another embodiment.

FIG. 5 is a partial cross-sectional view of the inner active material layer 322 and a ceramic layer 323 formed in the inner surface 120a of the can 120, according to another embodiment. As shown in FIG. 5, an inner active material layer 322 may have a substantially uniform thickness along the inner surface 120a of the can 120, and concurrently predetermined grooves 322a may be formed in the inner active material layer 322. In some embodiments, the grooves 322a are formed in the inner active material layer 322 formed in the inner surface 120a of the can 120. This structure increases a contact area between the ceramic layer 323 disposed to cover the inner active material layer 322 and the inner active material layer 322, thereby further enhancing a function of preventing the inner active material layer 322 from being separated and a function of the ceramic layer 323 relating to a battery stability.

Although the inner active material layer 122 formed in the inner surface 120a of the can 120 is formed of the negative active material in the present embodiment, the present invention is not limited thereto. For example, the inner active material layer 122 formed in the inner surface 120a of the can 120 may be formed of the positive active material. In this case, a part of the electrode assembly 110 that is the closest to the inner surface 120a of the can 120 is configured as the negative electrode plate 111 in which the negative active material is disposed so that charging and discharging responses may occur. A ceramic layer (or securing layer) 123 may be formed in the inner surface 120a of the can 120 to cover the inner active material layer 122.

In one embodiment, as shown in FIG. 3A, the ceramic layer 123 is continuously formed on the inner surface 120a of the can 120. In another embodiment, as shown in FIG. 3B, the ceramic layer 123 is discontinuously formed on the inner surface 120a of the can 120.

The ceramic layer 123 may be formed of at least one of a metal oxide, a metal nitride, a metal hydroxide, and a metal phosphide. The ceramic layer 123 performs a function of preventing the inner active material layer 122 from being separated. That is, the ceramic layer 123 is formed to be firmly adhered to the inner active material layer 122 so that the inner active material layer 122 is prevented from being separated from the inner surface 120a of the can 120 although a shock is applied to an external surface of the secondary battery 100. Further, the ceramic layer 123 increases a stability of the secondary battery 100, and, in particular, may reduce a danger of heating and explosion due to overcharging.

The metal oxide may be an oxide of metal including at least one of Al, Ti, Cr, Zr, Ca, Si, and Mg. For example, the metal oxide may be $Al_2O_3$, $MgO$, $TiO_2$, $Cr_2O_3$, $ZrO_2$, $CaO$, or $SiO_2$. The metal nitride may be a nitride of metal including at least one of Al, Ti, Cr, Zr, Ca, Si, and Mg. The metal phosphide may be a phosphide of metal including at least one of Al, Ti, Cr, Zr, Ca, Si, and Mg. The metal hydroxide may be a hydroxide of metal including at least one of Al, Ti, Cr, Zr, Ca, Si, and Mg. For example, the metal hydroxide may be $Al(OH)_2$, $Mg(OH)_2$, or $Ti(OH)_4$.

Meanwhile, the thickness of the ceramic layer 123 may be from about 2 μm to about 6 μm in consideration of a mobility of lithium ions. The present invention is not limited thereto. The ceramic layer 123 may have different thicknesses.

The ceramic layer 123 may further include heat resistant resin as a binder. The heat resistant resin may use aramid resin, polyamideimide resin, polyimide resin. A ratio of the heat resistant resin in the ceramic layer 123 may be from about 50 wt %:50 wt % to about 90 wt %:about 10 wt % or may be from about 60 wt %:about 40 wt % to about 80 wt %:about 10 wt %.

Meanwhile, although the ceramic layer 123 according to the present embodiment is away from the separator 112 disposed in the outermost part of the electrode assembly 110, the present invention is not limited thereto. That is, according to the present embodiment, the ceramic layer 123 may be disposed to contact the separator 112 disposed in the outermost part of the electrode assembly 110. Meanwhile, the cap assembly 130 includes a fixed plate 131, an insulator 132, a variable plate 133, a cap cover 134, and a gasket 135.

The fixed plate 131 is electrically connected to the positive electrode tap 114. A vent hole 131a is formed in the fixed plate 131. The insulator 132 is stacked on an upper surface of the fixed plate 131 and is formed of an electrically insulating material.

The variable plate 133 is coupled to an upper opening of the can 120 and electrically connected to the fixed plate 131. The variable plate 133 may be formed in a structure and of a material that may be modified due to a battery inner pressure. The cap cover 134 is installed in an upper portion of the variable plate 133. A plurality of through holes 134a are formed in the cap cover 134 so as to easily discharge gas.

The gasket 135 is formed of an approximately ring shape and has a function of insulating the fixed plate 131, the insulator 132, the variable plate 133, and the cap cover 134 from the inner surface 120a of the can 120. Meanwhile, an electrolyte (not shown) is injected into the inside of the can 120 and functions to move lithium ions generated by an electrochemical response in the negative electrode plate 111 and the positive electrode plate 113 of a battery during charging and discharging.

The electrolyte may be a non-water based organic electrolyte that is a mixture of lithium salt and a high purity organic solvent. Also, although the electrolyte may be a polymer using a polymer electrolyte, it will be understood that the type of electrolyte can be modified in various ways.

As described above, the inner active material layer 122 is formed in the inner surface 120a of the can 120, which increases the filling amount of an active material according to the area of the inner surface 120a of the can 120, thereby enhancing the performance of the secondary battery 100. The ceramic layer 123 is formed to cover the inner active material layer 122, which prevents the inner active material layer 122 from peeling off and provides enhanced stability during overcharging.

At least one of the disclosed embodiments improves charging and discharging capacity, prevents a removal of an inner active material layer, and improves overcharging stability.

It should be understood that the above embodiments should be considered in a descriptive sense only and not for purposes of limitation. Descriptions of features or aspects within each embodiment should typically be considered as available for other similar features or aspects in other embodiments.

What is claimed is:

1. A secondary battery, comprising:
   an electrode assembly comprising i) a positive electrode plate on which a positive active material is formed, ii) a negative electrode plate on which a negative active material is formed, and iii) a separator separating the positive and negative electrode plates;
   a can accommodating the electrode assembly, wherein the can has an inner surface facing the electrode assembly;
   an inner active material layer formed on the inner surface of the can; and
   a securing layer covering the inner active material layer.

2. The battery of claim 1, wherein the securing layer is formed of a material comprising a ceramic.

3. The battery of claim 1, wherein the inner active material layer is formed of a material substantially similar to one of the positive and negative active materials.

4. The battery of claim 1, wherein the inner active material layer has a substantially uniform thickness.

5. The battery of claim 1, wherein the thickness of the securing layer is in the range from about 2 μm to about 6 μm.

6. The battery of claim 1, wherein the surface of the inner active material layer is non-planar.

7. The battery of claim 1, wherein the surface of the inner active material layer has a wave shape.

8. The battery of claim 1, wherein the inner active material layer is \ discontinuous.

9. The battery of claim 1, wherein the securing layer is formed of a material comprising at least one of a metal oxide, a metal nitride, a metal hydroxide, and a metal phosphide.

10. The battery of claim 9, wherein each of the metal oxide, the metal nitride, the metal hydroxide and the metal phosphide comprises at least one of Al, Ti, Cr, Zr, Ca, Si, and Mg.

11. The battery of claim 1, wherein the separator is formed on the outermost surface of the electrode assembly.

12. The battery of claim 1, wherein the securing layer is formed of a material comprising a heat resistant resin.

13. The battery of claim 12, wherein the heat resistant resin comprises at least one of the following: aramid resin, polyamideimide resin and polyimide resin.

14. The battery of claim 12, wherein the ratio of the heat resistant resin and the remaining component of the securing layer is in the range from about 50 wt %:about 50 wt. % to about 90 wt. %:about 10 wt. %.

15. The battery of claim 12, wherein the ratio of the heat resistant resin and the remaining component of the layer is in the range from about 60 wt. %:about 40 wt. % to about 80 wt. %:about 20 wt. %.

16. A secondary battery, comprising:
   an electrode assembly having a first portion which is coated with a positive active material and a second portion which is coated with a negative active material, and wherein the first portion is separated from the second portion;
   a can accommodating the electrode assembly, wherein the can has an inner surface facing the electrode assembly, and wherein the inner surface is coated with one of the positive and negative active materials; and
   a securing layer at least partially covering the coated inner surface of the can.

17. The battery of claim 16, wherein the securing layer has a surface contacting the inner surface of the can, and wherein a plurality of concave portions and a plurality of convex portions are alternately formed on the surface of the securing layer.

18. A secondary battery, comprising:
   a can accommodating an electrode assembly, wherein the can has an inner surface facing the electrode assembly, and wherein the can has an electrical polarity, wherein the inner surface of the can is coated with a positive active material or a negative active material; and
   a securing layer covering the inner coated layer.

19. The battery of claim 18, wherein the securing layer has a surface contacting the inner surface of the can, and wherein a plurality of concave portions and a plurality of convex portions are alternately formed on the surface of the securing layer.

20. The battery of claim 18, wherein the inner positive or negative active material layer is discontinuous.

* * * * *